United States Patent [19]

Beck

[11] Patent Number: 5,057,296
[45] Date of Patent: Oct. 15, 1991

[54] METHOD FOR SYNTHESIZING MESOPOROUS CRYSTALLINE MATERIAL

[75] Inventor: Jeffrey S. Beck, Princeton, N.J.
[73] Assignee: Mobil Oil Corp., Fairfax, Va.
[21] Appl. No.: 625,171
[22] Filed: Dec. 10, 1990
[51] Int. Cl.$^5$ .............................................. C01B 35/12
[52] U.S. Cl. .................... 423/277; 423/305; 423/306; 423/326; 423/328; 423/329; 423/263; 423/593
[58] Field of Search ............... 423/277, 305, 306, 326, 423/328, 329, 263, 593

[56] References Cited

U.S. PATENT DOCUMENTS

| | | | |
|---|---|---|---|
| 3,355,246 | 11/1967 | Kuehl | 23/113 |
| 3,791,964 | 2/1974 | Kuehl | 208/120 |
| 4,176,090 | 11/1979 | Vaughan et al. | 252/455 Z |
| 4,216,188 | 8/1980 | Shabria et al. | 423/118 |
| 4,248,739 | 2/1981 | Vaughan et al. | 252/455 R |
| 4,310,440 | 1/1982 | Wilson et al. | 252/435 |
| 4,367,163 | 1/1983 | Pinnavaia et al. | 252/455 R |
| 4,385,994 | 5/1983 | Wilson et al. | 210/689 |
| 4,440,871 | 4/1984 | Lok et al. | 502/214 |
| 4,673,559 | 6/1987 | Derouane et al. | 423/306 |
| 4,831,006 | 5/1989 | Aufdembrink | 502/242 |
| 4,859,648 | 8/1989 | Landis et al. | 502/242 |
| 4,880,611 | 11/1989 | von Ballmoos et al. | 423/306 |

OTHER PUBLICATIONS

Kirk-Othmer Encyclopedia of Chemical Technology, 3rd ed., vol. 20, pp. 766-781, Wefers, K., et al, "Oxides and Hydroxides of Aluminum", Tech. Paper #19, revised, Alcoa Res., pp. 54-59 (1987).
Moore, P. B., et al. "An X-Ray Structural Study of Cacoxenite, a Mineral Phosphate", Nature vol. 306, No. 5941 (1983).
Szostak, R. et al., "Ultralarge Pore Molecular Sieves: Characterization of the 14 Angstroms Pore Mineral, Cacoxenite", Zeolites: Facts, Figures and Future, Elseview Sc. Pub., B.V. (1989).
d'Yvoire, F., "Memoir: Study of Aluminum Phosphate and Trivalent Iron", (1961), pp. 1762-1776.

Primary Examiner—R. Bruce Breneman
Attorney, Agent, or Firm—Alexander J. McKillop; Charles J. Speciale; Dennis P. Santini

[57] ABSTRACT

This invention relates to an improved method for synthesizing a new synthetic composition of ultra-large pore crystalline material which can be used as a sorbent or catalyst component for conversion of organic and inorganic compounds. The crystalline material product of this method exhibits unusually large sorption capacity demonstrated by its benzene adsorption capacity of greater than about 15 grams benzene/100 grams at 50 torr and 25° C., and an arrangement of uniformly sized pores with a maximum perpendicular cross section of at least about 13 Angstrom units.

43 Claims, 2 Drawing Sheets

METHOD FOR SYNTHESIZING MESOPOROUS CRYSTALLINE MATERIAL

BACKGROUND OF THE INVENTION

1. Field of the Invention

This invention relates to an improved method for synthesizing a novel composition of synthetic ultra-large pore crystalline material which can be used as a sorbent or a catalyst component.

2. Description of the Prior Art

Porous inorganic solids have found great utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100-250 Angstrom particles of dense amorphous silica (*Kirk-Othmer Encyclopedia of Chemical Technology*, 3rd Edition, Vol. 20, John Wiley & Sons, New York, p. 766-781, 1982), with the porosity resulting from voids between the particles. Since there is no long range order in these materials, the pores tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No. 19 Revised, Alcoa Research Laboratories, p. 54-59, 1987). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Angstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicate of varying alumina and metal content.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of F. d'Yvoire, *Memoir Presented to the Chemical Society*, No. 392, "Study of Aluminum Phosphate and Trivalent Iron", July 6, 1961 (received), pp. 1762-1776. This material, when crystalline, is identified by the JCPDS International Center for Diffraction Data card number 15-274. Once heated at about 110° C., however, the d'Yvoire material becomes amorphous or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12-13 Angstroms in diameter are taught in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356-358 (1983) to have a framework structure containing very large channels with a calculated free pore diameter of 14.2 Angstroms. R. Szostak et al., *Zeolites: Facts, Figures, Future*, Elsevier Science Publishers B.V., 1989, present work showing cacoxenite as being very hydrophilic, i.e. adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e. silicoaluminophosphates of particular structures are taught in U.S. Pat. Nos. 3,355,246 (i.e. ZK-21) and 3,791,964 (i.e. ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appear to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous. Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550. The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, tritianates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, as a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

Applicant knows of no prior art teaching the present improved synthesis of ultra-large pore non-layered crystalline materials.

SUMMARY OF THE INVENTION

The present invention is directed to an improved method for synthesis of a novel synthetic composition of matter comprising an ultra-large pore crystalline phase which is useful as a sorbent or catalyst component for conversion of organic and inorganic compounds contacted therewith. The present improved method provides product crystalline material with increased pore size and pore volume compared to the crystalline material produced in like manner but without the improvement hereby claimed. This method also provides the ability to control product pore size. Results from pore volume measurements, of course, depend upon relative sample purities. This invention permits tailoring the pore size of a particular product for a particular use.

The crystalline material synthesized by the present invention is an inorganic, porous, non-layered phase having an arrangement of uniformly-sized pores with a maximum perpendicular cross-section pore dimension of at least about 13 Angstroms, and within the range of from about 13 Angstroms to about 200 Angstroms.

In its calcined form, the crystalline material of the invention may be characterized by an X-ray diffraction pattern with at least one peak at a position greater than about 18 Angstrom Units d-spacing (4.909 degrees two-theta for Cu K-alpha radiation) and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

More particularly, the calcined crystalline material of the invention may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom Units d-spacing with relative intensity greater than about 20% of the strongest peak. Still more particularly, the X-ray diffraction pattern of the calcined material of this invention will have no peaks at positions less than about 10 Angstrom Units d-spacing with relative intensity greater than about 10% of the strongest peak.

One important embodiment of the present invention is the synthesis of an inorganic, porous, non-layered phase having a hexagonal arrangement of uniformly-sized pores with a maximum perpendicular cross-section pore dimension within the range of from about 13 Angstroms to about 200 Angstroms. This crystalline composition embodiment exhibits a hexagonal electron diffraction pattern that can be indexed with a $d_{100}$ value greater than about 18 Angstroms, and a benzene adsorption capacity of greater than about 15 grams benzene/100 grams crystal at 50 torr and 25° C.

DESCRIPTION OF SPECIFIC EMBODIMENTS

Figure 1:
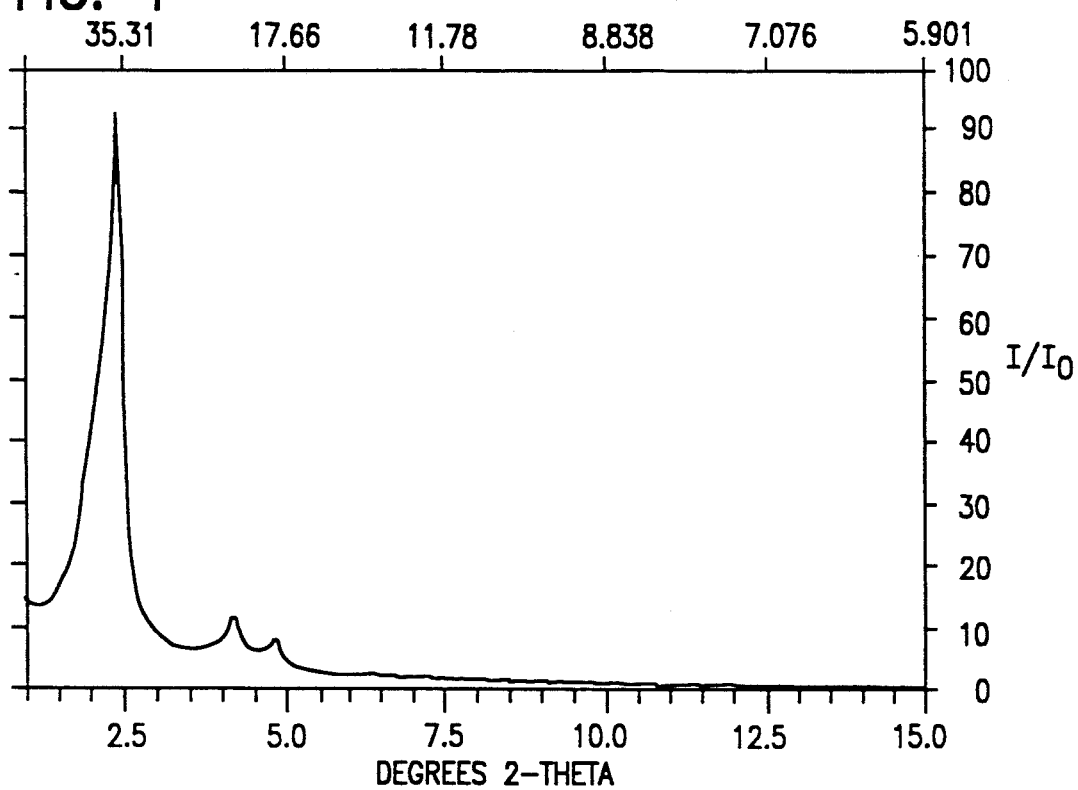
FIG. 1 is an X-ray diffraction pattern of the product of Example 1, hereinafter presented.

As demonstrated hereinafter, the inorganic, non-layered mesoporous crystalline material prepared by the improved method of this invention has the following composition:

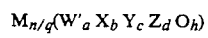

wherein W' is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W', X, Y and Z, respectively; h is a number of from 1 to 2.5; and $(a+b+c+d)=1$.

A preferred embodiment of the above crystalline material is when $(a+b+c)$ is greater than d, and h=2. A further embodiment is when a and d=0, and h=2.

In the as-synthesized form, the material prepared by the method of this invention has a composition, on an anhydrous basis, expressed empirically as follows:

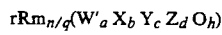

wherein R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g. sodium or chloride, ions of the as-synthesized material can be replaced in accordance with techniques well known in the art, at least in part, by ion exchange with other ions. Preferred replacing ions include metal ions, hydrogen ions, hydrogen precursor, e.g. ammonium, ions and mixtures thereof. Particularly preferred ions are those which tailor the catalytic activity for certain hydrocarbon conversion reactions. These include hydrogen, rare earth metals and metals of Groups IA (e.g. K), IIA (e.g. Ca), VIIA (e.g. Mn), VIIIA (e.g. Ni),IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806, 1979) and mixtures thereof.

The crystalline (i.e. meant here as having sufficient order to provide a diffraction pattern such as, for example, by X-ray, electron or neutron diffraction, following calcination with at least one peak) mesoporous material prepared by the method of this invention may be characterized by its heretofore unknown structure, including extremely large pore windows, and high sorption capacity. The term "mesoporous" is used here to indicate crystals having uniform pores within the range of from about 13 Angstroms to about 200 Angstroms in diameter. The materials hereby prepared will have uniform pores within the range of from about 13 Angstroms to about 200 Angstroms, more usually from about 15 Angstroms to about 100 Angstroms in diameter. For the purposes of this application, a working definition of "porous" is a material that adsorbs at least 1 gram of a small molecule, such as Ar, $N_2$, n-hexane, benzene or cyclohexane, per 100 grams of the solid.

The material synthesized hereby can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. One embodiment of the material appears to have a hexagonal arrangement of large open channels that can be synthesized with open internal diameters from about 13 Angstroms to about 200 Angstroms. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on such factors as the quality of the material's preparation and/or the pore diameter/wall thickness ratio. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns.

The most regular preparations of the present invention give an X-ray diffraction pattern with a few distinct maxima in the extreme low angle region. In one embodiment the positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of one embodiment of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance $a_0$ between channels observed in the electron micrographs through the formula $d_{100}=a_0\sqrt{3}/2$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. In this embodiment, the patterns can be indexed with the hexagonal hk0 subset of unique reflections of 100, 110, 200, 210, etc., and their symmetry-related reflections.

In its calcined form, the crystalline material hereby synthesized may be characterized by an X-ray diffraction pattern with at least one peak at a position greater than about 18 Angstrom Units d-spacing (4.909 degrees two-theta for Cu K-alpha radiation) and an equilibrium benzene adsorption capacity of greater than about 15 grams benzene/100 grams crystal at 50 torr and 25° C. (basis: crystal material having been treated in an attempt to insure no pore blockage by incidental contaminants, if necessary). If the material is hexagonal, the peak at a position greater than about 18 Angstrom Units d-spacing will correspond to the $d_{100}$ value of the electron diffraction pattern of the material.

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal of the invention.

More particularly, the calcined crystalline non-layered material hereby prepared may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the calcined material product of this invention will have no peaks at positions less than about 10 Angstrom units d-spacing with relative intensity greater than about 10% of the strongest peak. In the hexagonal embodiment, at least one peak in the X-ray diffraction pattern will have a d-spacing that corresponds to the $d_{100}$ value of the electron diffraction pattern of the material.

Still more particularly, the calcined inorganic, non-layered crystalline material product of the invention is characterized as having a pore size of about 13 Angstroms or greater as measured by physisorption measurements, hereinafter more particularly set forth. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The products of the present invention that have the largest pore sizes may require more highly collimated incident X-ray beams in order to resolve the low angle peak from the transmitted incident X-ray beam. The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the product of the invention, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

When used as a sorbent or catalyst component, the product of the invention should be subjected to treatment to remove part or all of any organic constituent. The product composition can also be used as a catalyst component in intimate combination with a hydrogenating component such as tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, exchanged into the composition to the extent a Group IIIB element, e.g. aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The crystalline material product of this invention, when employed either as an adsorbent or as a catalyst component in an organic compound conversion process should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The usual method for synthesis of the ultra-large pore crystalline material involves preparation of a particular reaction mixture comprising sources of alkali or alkaline earth metal cation, if desired, one or a combination of oxides selected from the group consisting of divalent element, trivalent element, tetravalent element and pentavalent element, an organic directing agent and solvent or solvent mixture, maintaining said mixture under sufficient conditions of pH, temperature and time for formation of said composition of matter, and recovering said composition of matter. In this usual method, the organic directing agent, more particularly described later, is an ion of the formula $R_1R_2R_3R_4Q^+$, wherein Q is nitrogen or phosphorus and wherein at least one of $R_1$, $R_2$, $R_3$ and $R_4$ is aryl or alkyl of from 6 to about 36 carbon atoms or combinations thereof, the remainder of $R_1$, $R_2$, $R_3$ and $R_4$ being selected from the group consisting of hydrogen, alkyl of from 1 to 5 carbon atoms and combinations thereof. The compound from which the above organic directing agent ammonium or phosphonium ion is derived may be, for example, the hydroxide, halide, silicate or mixture thereof. The solvent or solvent mixture for use in the usual method comprises a $C_1$–$C_6$ alcohol, $C_1$–$C_6$ diol, water or mixture thereof, with water preferred.

A reaction mixture useful for the usual method has an $X_2O_3/YO_2$ mole ratio of from 0 to about 0.5, but an $Al_2O_3/SiO_2$ mole ratio of from 0 to 0.01. The crystallization temperature is from about 25° C. to about 250° C., preferably from about 50° C. to about 175° C. This first reaction mixture contains sources of, for example, alkali or alkaline earth metal (M), e.g. sodium or potassium, cation, if desired, one or a combination of oxides selected from the group consisting of divalent element W', e.g. cobalt, trivalent element X, e.g. aluminum, tetravalent element Y, e.g. silicon, and pentavalent element Z, (e.g. phosphorus, the organic (R) directing agent, and the solvent or solvent mixture, such as, for example, $C_1$–$C_6$ alcohols, $C_1$–$C_6$ diols and/or water, especially water. This reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + W'O + Z_2O_5)$ | 0.1 to 100 | 0.1 to 20 |
| Solvent/ $(YO_2 + W'O + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/ (YO_2 + W'O + Z_2O_5 + X_2O_3)$ | 0.01 to 20 | 0.05 to 5 |
| $M_{2/e}O/ (YO_2 + W'O + Z_2O_5 + X_2O_3)$ | 0 to 10 | 0 to 5 |

-continued

| Reactants | Useful | Preferred |
|---|---|---|
| $R_{2/f}O/$ | 0.01 to 2.0 | 0.03 to 1.0 |
| $(YO_2 + W'O + Z_2O_5 + X_2O_3)$ | | | wherein e and f are the weighted average valences of M and R, respectively.

In synthesis from this first reaction mixture, when no Z and/or W' oxides are added to the reaction mixture, the pH is important and must be maintained at from about 9 to about 14. When Z and/or W' oxides are present in the reaction mixture, the pH is not narrowly important for synthesis of the present crystalline material. In this, as well as the following recipes for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the present material.

A second reaction mixture useful for the usual synthesis of the present crystalline material involves an $X_2O_3/YO_2$ mole ratio of from about 0 to about 0.5, sources of, for example, alkali or alkaline earth metal (M), e.g. sodium or potassium, cation, if desired, one or a combination of oxides selected from the group consisting of divalent element W', e.g. cobalt, trivalent element X, e.g. aluminum, tetravalent element Y, e.g. silicon, and pentavalent element Z, e.g. phosphorus, a combination of organic directing agent and additional organic directing agent (R), each hereinafter more particularly described, and the solvent or solvent mixture. This reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + W'O + Z_2O_5)$ | 0.1 to 100 | 0.1 to 20 |
| Solvent/ | 1 to 1500 | 5 to 1000 |
| $(YO_2 + W'O + Z_2O_5 + X_2O_3)$ | | |
| $OH^-/YO_2$ | 0 to 10 | 0 to 5 |
| $(M_{2/e}O + R_{2/f}O)/$ | 0.01 to 20 | 0.05 to 5 |
| $(YO_2 + W'O + Z_2O_5 + X_2O_3)$ | | |
| $M_{2/e}O/$ | 0 to 10 | 0 to 5 |
| $(YO_2 + W'O + Z_2O_5 + X_2O_3)$ | | |
| $R_{2/f}O/$ | 0.1 to 2.0 | 0.12 to 1.0 |
| $(YO_2 + W'O + Z_2O_5 + X_2O_3)$ | 0.1 to 2.0 | | wherein e and f are the weighted average valences of M and R, respectively.

For this second reaction mixture, when no Z and/or W oxides are added to the reaction mixture, the pH is important and must be maintained at from about 9 to about 14. When Z and/or W oxides are present in the reaction mixture, the pH is not narrowly important for crystallization of the present invention. The crystallization temperature for this mixture is from about 25° C. to about 250° C., preferably from about 50° C. to about 175° C.

Another reaction mixture for the usual synthesis is where X comprises aluminum and Y comprises silicon, and the organic directing agent, or, preferably a combination of that organic directing agent plus an additional organic directing agent, is used. This third reaction mixture comprises sources of, for example, alkali or alkaline earth metal (M), e.g. sodium or potassium, cation, if desired, one or more sources of aluminum and/or silicon, the organic (R) directing agent, hereinafter more particularly described, and the solvent or solvent mixture, and has a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| $Solvent/SiO_2$ | 1 to 1500 | 5 to 1000 |
| $OH^-/SiO_2$ | 0 to 10 | 0 to 5 |
| $(M_{2/e}O + R_{2/f}O)/$ | 0.01 to 20 | 0.05 to 5 |
| $(SiO_2 + Al_2O_3)$ | | |
| $M_{2/e}O/$ | 0 to 5 | 0 to 3 |
| $(SiO_2 + Al_2O_3)$ | | |
| $R_{2/f}O/$ | 0.01 to 2 | 0.03 to 1 |
| $(SiO_2 + Al_2O_3)$ | | | wherein e and f are the weighted average valences of M and R, respectively. The crystallization temperature for this mixture should be from about 25° C. to about 175° C., preferably from about 100° C. to about 175° C.

In the usual synthesis method involving the third reaction mixture, the pH is important and must be maintained at from about 9 to about 14. The method involving this third reaction mixture follows the steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for this synthesis involves the third reaction mixture above, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_{2/f}O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

The improvement of the present invention comprises adding an auxiliary organic to the reaction mixture prior to maintaining it for crystallization of the ultra-large pore crystalline material, such as prior to, during or immediately following addition of the other reaction mixture components. It is believed that the "primary template" in this improved method becomes the mixture of the auxiliary organic and the organic directing agent or organic directing agent mixture. This auxiliary organic must be selected from the group of organic compounds consisting of (1) aromatic hydrocarbons and amines of from 5 to 20 carbons and halogen- and $C_1$–$C_{14}$ alkyl-substituted derivatives thereof, (2) cyclic aliphatic hydrocarbons and amines of from 5 to 20 carbons and halogen- and $C_1$–$C_{14}$ alkyl-substituted derivatives thereof, (3) polycyclic aliphatic hydrocarbons and amines of from 6 to 20 carbons and halogen- and $C_1$–$C_{14}$ alkyl-substituted derivatives thereof, (4) straight and branched aliphatic hydrocarbons and amines of from 3 to 16 carbons and halogen-substituted derivatives thereof, and (5) combinations thereof. Of this group of organic compounds, the aromatic hydrocarbons (e.g. $C_6$–$C_{20}$), cyclic aliphatic hydrocarbons and polycyclic aliphatic hydrocarbons, and combinations thereof, are preferred.

In this group of auxiliary organic compounds for use in the present improved method, the halogen substituent in substituted derivatives may be, for example, bromine. The $C_1$–$C_{14}$ alkyl substituent in the substituted derivatives may be linear or branched aliphatic chains, such as, for example, methyl, ethyl, propyl, isopropyl, butyl, pentyl and combinations thereof. Non-limiting examples of these auxiliary organics include, for example, p-xylene, trimethylbenzene, triethylbenzene and triisopropylbenzene.

With the inclusion of the auxiliary organic into the reaction mixture, the mole ratio of auxiliary organic/$YO_2$ will be from about 0.05 to about 20, preferably from about 0.1 to about 10, and the mole ratio of auxiliary organic/$R_2/_fO$ will be from about 0.02 to about 100, preferably from about 0.05 to about 35.

In the above improved procedure, batch crystallization can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is from about 25° C. to about 175° C., preferably from about 50° C. to about 150° C. for a time sufficient for crystallization to occur at the temperature used, e.g. from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, average pore size of embodiments of the present non-layered crystalline material can be adjusted.

Non-limiting examples of various combinations of W', X, Y and Z contemplated for the procedure of the present invention include:

| W' | X | Y | Z |
|---|---|---|---|
| — | Al | Si | — |
| — | Al | — | P |
| — | Al | Si | P |
| Co | Al | — | P |
| Co | Al | Si | P |
| — | — | Si | — | including the combinations of W' being Mg, or an element selected from the divalent first row transition metals, e.g. Mn, Co and Fe; X being B, Ga or Fe; and Y being Ge.

An organic directing agent for use in the present procedure is an ammonium or phosphonium ion of the formula $R_1R_2R_3R_4Q^{30}$, i.e.:

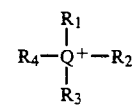

wherein Q is nitrogen or phosphorus and wherein at least one of $R_1$, $R_2$, $R_3$ and $R_4$ is aryl or alkyl of from 6 to about 36 carbon atoms, e.g. —$C_6H_{13}$, —$C_{10}H_{21}$, —$C_{12}H_{25}$, —$C_{14}H_{29}$, —$C_{16}H_{33}$ and —$C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third reaction mixtures above it is preferred to have the additional organic directing agent; and in the second reaction mixture it is required to have a combination of the above organic directing agent and the additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, myristyltrimethylammonium, cetyltrimethylphosphonium, octadecyltrimethylphosphonium, benzyltrimethylammonium, cetylpyridinium, decyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions. Pore size and volume will vary with the amount and physical properties, e.g. structure, boiling point, density, polarity, etc., of the auxiliary organic used, as will be evident from the examples which follow. Also, the auxiliary organic used permits tailoring the pore size of the product crystalline material, making that material more suitable for a particular use, as will be evident from the examples.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The compositions prepared by this invention are useful as catalyst components for catalyzing the conversion of organic compounds, e.g. oxygenates and hydrocarbons, by acid-catalyzed reactions. The size of the pores is also such that the spatiospecific selectivity with respect to transition state species is minimized in reactions such as cracking (Chen et al., "Shape Selective Catalysis in Industrial Applications", 36 CHEMICAL INDUSTRIES, pgs. 41-61 (1989) to which reference is made for a discussion of the factors affecting shape selectivity). Diffusional limitations are also minimized as a result of the very large pores in the present materials. For these reasons, the present compositions are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the present catalytic compositions will catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g. molecular sizes of about 13 Angstroms or more. The present catalytic compositions are particularly useful for reactions in which the molecular weight of the feed is reduced to a lower value, i.e. to reactions involving cracking such as cracking or hydrocracking. Cracking may be conducted at a temperature of from about 200° C. to about 800° C., a pressure of from about atmospheric to about 100 psig and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 hr$^{-1}$ to about 100 hr$^{-1}$, with a hydrogen/hydrocarbon molar ratio of from about 0.1 to about 100.

The catalytic compositions prepared according to the present invention may also be used for selective conversion of inorganic compounds such as oxides of nitrogen in mixtures of gases which contain nitrogen oxides ($NO_x$), for example, industrial exhaust gases and the gases formed during the oxidative regeneration of catalysts used in the processing of hydrocarbons, especialy in catalytic cracking operations. The porous crystalline material may be used in a matrixed or unmatrixed form for this purpose and may suitably be formed into extrudates, pellets or other shapes to permit the passage of gases over the catalyst with the minimum pressure drop. The crystalline material is preferably at least partly in the hydrogen form, but it may advantageously contain a minor amount of a noble metal as a catalytic component, especially a metal of Periods 5 and 6 of Group VIIIA of the Periodic Table, especially platinum, palladium, ruthenium, rhodium, iridium or mixtures thereof. Amounts of noble metal up to about 1 weight percent are typical with lower amounts, e.g. up to about 0.1 or 0.5 weight percent being preferred.

The $NO_x$ reduction is suitably conducted by passing the gas containing the oxides of nitrogen over the catalyst at an elevated temperature, typically at least 200° C., and usually within the range of 200° to 600° C. The gas mixture may be mixed with ammonia to promote reduction of the oxides of nitrogen and pre-mixing may be conducted at a temperature of up to about 200° C. The amount of ammonia which is mixed with the gas mixture is typically within the range of 0.75 to 1.25 the stoichiometric amount, which itself varies according to the ratio of the different oxides of nitrogen in the gas mixture, as shown by the equations:

$$6NO_2 + 8NH_3 = 7N_2 + 12H_2O$$

$$6NO + 4NH_3 = 5N_2 + 6H_2O$$

The crystalline catalytic compositions may also be used for the reduction of oxides of nitrogen in gaseous mixtures in the presence of other reducing agents such as carbon or carbon monoxide. Reduction of the oxides of nitrogen in this way is of particular utility in the regeneration of fluid catalytic cracking (FCC) catalysts, since regeneration under appropriate conditions will produce the required concentrations of carbon monoxide which may then be used to reduce the proportion of $NO_x$ in the regeneration gases in the presence of the catalyst.

Because the present catalytic compositions have been found to be stable, their use as cracking catalysts, e.g. in fluid catalytic cracking processes, with resid feeds will represent an especially favorable mode of utilization. Still further, they may be used in combination with one or more other catalyst components such as, for example, cracking catalysts comprising silica-alumina and/or zeolite Y, e.g. USY.

The present catalytic compositions are especially useful for reactions using high molecular weight, high boiling or non-distillable feeds, especially residual feeds, i.e. feeds which are essentially non-distillable or feeds which have an initial boiling point (5% point) above about 1050° F. Residual feeds which may be used with the present catalytic compositions include feeds with API gravities below about 20, usually below 15 and typically from 5 to 10 with Conradsen Carbon Contents (CCR) of at least 1% by weight and more usually at least 5% or more, e.g. 5-10%. In some resid fractions the CCR may be as high as about 20 weight percent or even higher. The aromatic contents of these feeds will be correspondingly high, as may the contents of heteroatoms such as sulfur and nitrogen, as well as metals. Aromatics content of these feeds will usually be at least 50 weight percent and typically much higher, usually at least 70 or 80 weight percent, with the balance being principally naphthenes and heterocyclics. Typical petroleum refinery feeds of this type include atmospheric and vacuum tower resids, asphalts, aromatic extracts from solvent extraction processes, e.g. phenol or furfural extraction, deasphalted oils, slop oils and residual fractions from various processes such as lube production, coking and the like. High boiling fractions with which the present catalytic compositions may be used include gas oils, such as atmospheric gas oils; vacuum gas oils; cycle oils, especially heavy cycle oil; deasphalted oils; solvent extracts, such as bright stock; heavy gas oils, such as coker heavy gas oils; and the like. The present catalytic materials may also be utilized with feeds of non-petroleum origin, for example, synthetic oils produced by coal liquefaction, Fischer-Tropsch waxes and heavy fractions and other similar materials.

The compositions resulting from this invention can also be used as adsorbents and separation vehicles in pharmaceutical and fine chemical applications. For example, these ultra-large pore compositions may be used in the purification of drugs like insulin or be used as solid vehicles for the controlled delivery of drugs. Another application for use of these ultra-large pore materials involves waste disposal where the extraordinary pore volumes are exploited. Therefore, at least one component can be partially or substantially totally separated from a mixture of components having differential sorption characteristics with respect to the present ultra-large pore composition by contacting the mixture with the composition to selectively sorb the one component. Examples of this include contacting a mixture comprising water and at least one hydrocarbon component, whereby the at least one hydrocarbon component is selectively sorbed. Another example includes selective sorption of at least one hydrocarbon component from a mixture comprising same and at least one additional hydrocarbon component.

As in the case of many catalysts, it may be desired to incorporate the new crystal composition with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix materials in colloidal form so as to facilitate extrusion of the bound catalyst components(s).

The relative proportions of finely divided crystalline material and inorganic oxide matrix vary widely, with the crystal content ranging from about 1 to about 90 percent by weight and more usually, particularly when the composite is prepared in the form of beads in the range of about 2 to about 80 weight percent of the composite.

In order to more fully illustrate the nature of the invention and the manner of practicing same, the following examples are presented. In the examples, whenever sorption data are set forth for comparison of sorptive capacities for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 g/100 g/ and more particularly greater than about 20 g/100 g. At 60 Torr and 25° C., the present composition exhibits an equilibrium benzene adsorption capacity of greater than 15 grams/100 grams.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat. Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

In the examples, percentages are by weight unless otherwise indicated.

EXAMPLE 1

In Example 1 an ultra-large pore crystalline material was synthesized without the present improvement. In this example, 1.65 grams of $NaAlO_2$ was added to 80 grams of cetyltrimethylammonium hydroxide (CTMAOH) solution, prepared by contacting a 29 wt. % N,N,N-trimethyl-1-hexadecanaminium chloride solution with a hydroxide-for-halide exchange resin. The mixture was stirred until the $NaAlO_2$ was completely dissolved. To this solution was added 40.0 grams of tetramethylammonium silicate solution (10 wt. % $SiO_2$) and 10.0 grams of HiSil (90 wt. % $SiO_2$) The resulting mixture was stirred at room temperature for several minutes. The gel was then loaded into a 300 ml autoclave and heated to 105° C. while stirring at 150 RPM. After about 4 hours of heating, the reaction was quenched with cold water, and the contents removed. The product was filtered and washed several times with warm (60°–70° C.) distilled water and with acetone. The final product was calcined to 538° C. in a $N_2$/air mixture for 8 hours.

The gel reaction mixture had a composition in terms of moles per mole $Al_2O_3$ as follows:
  1.25 moles $Na_2O$
  27.8 moles $SiO_2$
  5.1 moles $(CTMA)_2O$
  2.24 moles $(TMA)_2O$
  650 moles $H_2O$ The calcined product of this example proved to have a surface area of 1187 $m^2/g$ and a benzene adsorption capacity of 66 grams/100 grams.

The X-ray diffraction pattern of the calcined product of this example is shown in FIG. 1. In this Figure, it is noted that 10 Angstrom Units d-spacing corresponds to 8.84 degrees 2-theta (Cu K-alpha radiation) and 18 Angstrom Units corresponds to 4.909 degrees.

The product of this example may be characterized as including a very strong relative intensity line at 36.8±2.0 Angstroms d-spacing, and weak lines at 21.2±1.0 and 18.3±1.0 Angstroms. The ultra-large pore material product of this example was examined by transmission electron microscopy (TEM), which produced images of a hexagonal arrangement of uniform pores and hexagonal electron diffraction pattern with a $d_{100}$ value of about 38 Angstroms.

EXAMPLES 2-9

Figure 2:
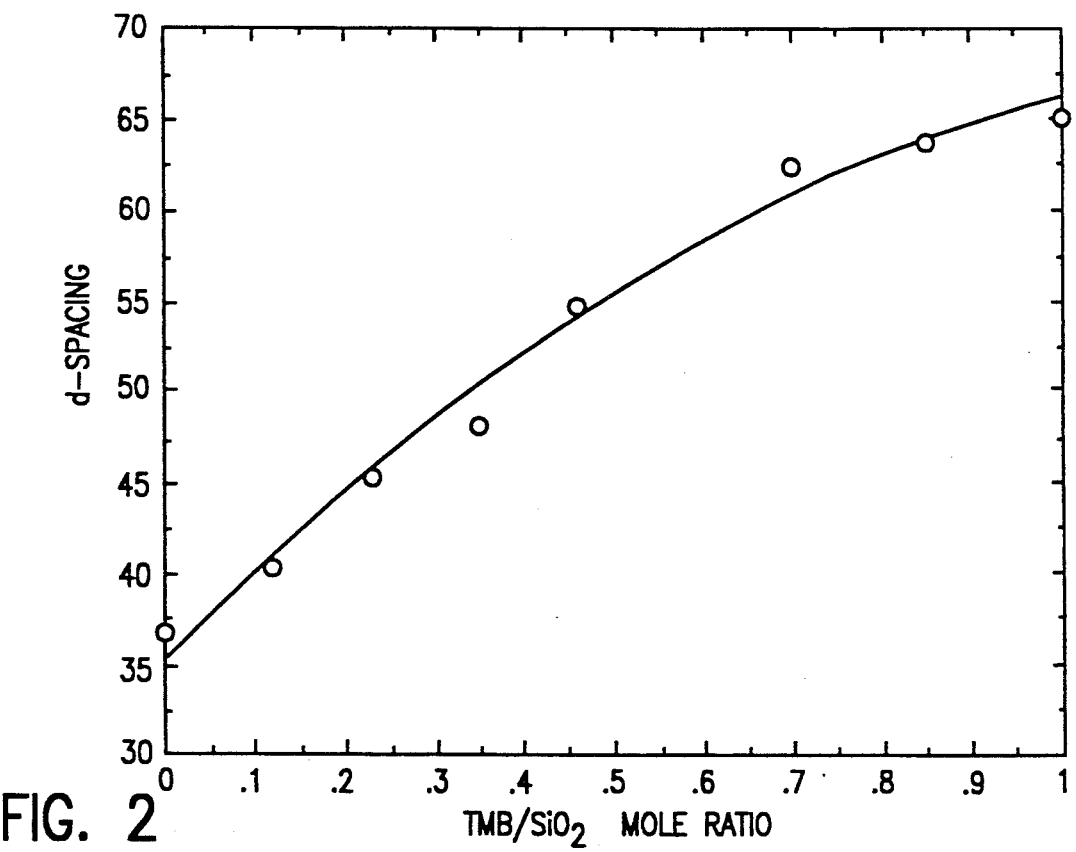
FIG. 2 shows the effect of auxiliary organic on the d-spacing of the first X-ray diffraction maxima for Examples 1-9.
Figure 3:
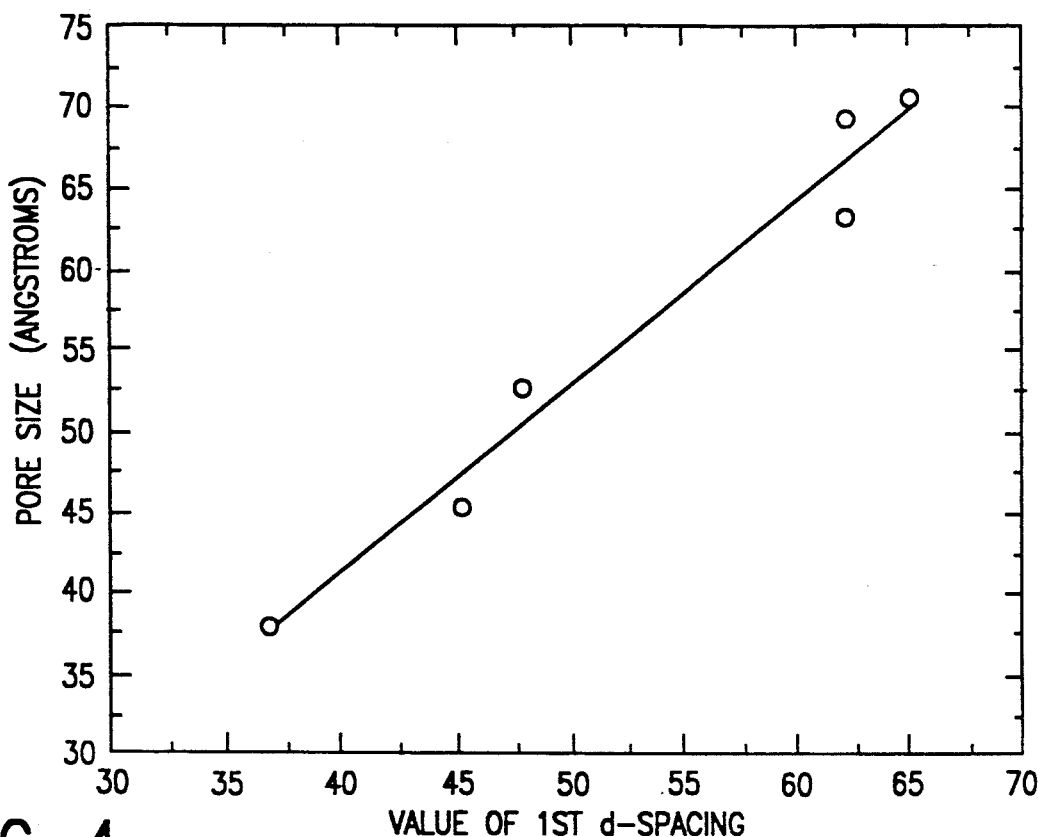
FIG. 3 is a plot of pore size versus X-ray d-spacing for the products of Examples 1,3,4,6,7 and 9.
Figure 4:
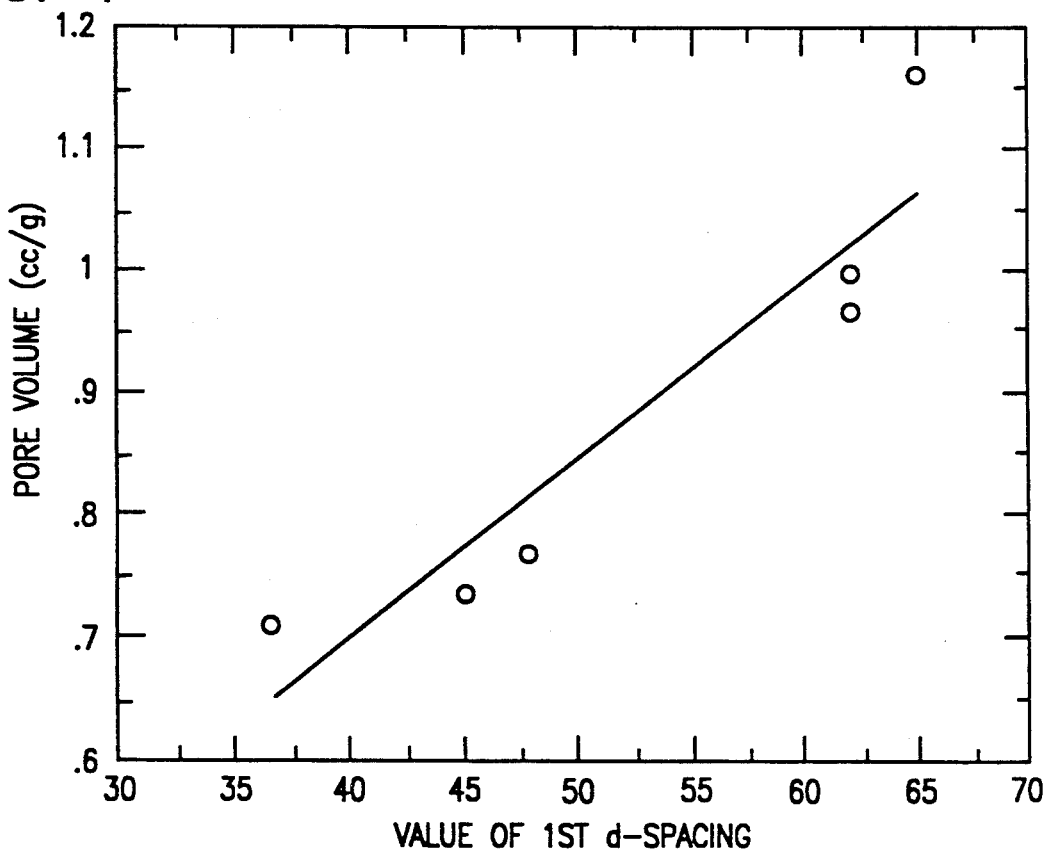
FIG. 4 is a plot of pore volume versus X-ray d-spacing for the products of Examples 1,3,4,6,7 and 9.

Eight separate experiments were conducted following the procedure of Example 1, but with an auxiliary organic added in accordance with the present invention. In each case the auxiliary organic was 1,3,5-trimethylbenzene (TMB) added to the reaction mixture as the last ingredient. The concentration of TMB was varied between the experiments, as shown in Table A. Also shown in Table A are the product pore sizes in Angstroms, determined as hereinafter detailed, pore volumes in cc/g and surface areas in $m^2/g$. The pore size and pore volume values for Examples 2,5 and 8 were extrapolated from plots of d-spacings versus measured pore sizes and pore volumes for the other examples (see FIGS. 3 and 4). The strongest X-ray diffraction lines are also indicated for comparison purposes. FIG. 2 plots the effect of TMB auxiliary organic on the d-spacing of the first X-ray diffraction pattern maxima in terms of moles of TMB/mole $SiO_2$ in the respective reaction mixture. The present improvement is readily observed from this data. As the concentration of the auxiliary organic is increased in the reaction mixture, pore size and volume increase for the product crystalline material.

The calcined products of these examples had the equilibrium benzene adsorption values shown in Table B.

TABLE A

| Example | Moles TMB | Mole Ratio TMB/$SiO_2$ | Mole Ratio TMB/$CTMA^+$ | d-Spacing, Å | Pore Size, Å | Pore Vol., cc/g | Surface Area, $m^2/g$ |
|---|---|---|---|---|---|---|---|
| 1 | 0 | 0 | 0 | 36.8 | 32, 37.7[1] | 0.71 | 1186.8 |
| 2 | 0.025 | 0.12 | 0.32 | 40.3 | 41.5 | 0.70 | |
| 3 | 0.050 | 0.23 | 0.65 | 45.3 | 45.1[1] | 0.74 | 948.6 |
| 4 | 0.075 | 0.35 | 0.97 | 48.1 | 52.5[1] | 0.77 | 1299.3 |
| 5 | 0.100 | 0.46 | 1.30 | 54.8 | 58.0 | 0.91 | |
| 6 | 0.150 | 0.70 | 1.95 | 62.2 | 63.0[2] | 0.97 | 975.4 |
| 7 | 0.150 | 0.70 | 1.95 | 62.2 | 69.0[2] | 1.00 | 1655.1 |
| 8 | 0.183 | 0.85 | 2.38 | 63.7 | 68.1 | 1.04 | |
| 9 | 0.216 | 1.00 | 2.80 | 65.1 | 70.2[2] | 1.16 | 1043.9 |

[1] From Horvath-Kawazoe method. (Example 43 (a)).
[2] From Dollimore-Heal relationships. (Example 43 (b)).

TABLE B

| EQUILIBRIUM BENZENE ADSORPTION VALUES (g/100 g) | | |
|---|---|---|
| Example | 50 Torr | 60 Torr |
| 1 | 66 | 67 |
| 2 | 61 | 63 |
| 3 | 62 | 63 |
| 4 | 48 | 56 |
| 5 | 37 | 45 |
| 6 | 43 | 51 |
| 7 | 36 | 44 |
| 8 | 32 | 37 |
| 9 | 38 | 44 |

EXAMPLES 10-40

To exemplify which organic compounds provide the present improvement as auxiliary organics, many experiments were conducted. Examples 10-40 demonstrate these experiments. Each of these examples followed the procedure of Example 1, except for the addition of 10 grams of potential auxiliary organic directly before the addition of the HiSil in the reaction mixture. The potential auxiliary organic compounds were varied, as indicated in Table C. The boiling point, density and molecular weight of each potential auxiliary organic is indicated, along with the moles added, the auxiliary organic/SiO$_2$ molar ratio in the reaction mixture, and the strongest X-ray diffraction line of the calcined products.

From these experiments, it is observed that for the present improvement to be realized to the fullest extent, the auxiliary organic must be selected from the group comprising (1) aromatic hydrocarbons and amines of from 5 to 20 carbons and halogen- and C$_1$–C$_{14}$ alkyl-substituted derivatives thereof, (2) cyclic aliphatic hydrocarbons and amines of from 5 to 20 carbons and halogen- and C$_1$–C$_{14}$ alkyl-substituted derivatives thereof, (3) polycyclic aliphatic hydrocarbons and amines of from 6 to 20 carbons and halogen- and C$_1$–C$_{14}$ alkyl-substituted derivatives thereof, (4) straight and branched aliphatic hydrocarbons and amines of from 3 to 16 carbons and halogen-substituted derivatives thereof, and (5) combinations thereof. Examples 12–15 and 19 demonstrate preferred auxiliary organics, with Examples 10, 11, 16, 20–26, 28, 29, 38 and 39 identifying auxiliary organics also providing the improvement. Examples 17, 18, 27, 30–37 and 40 demonstrate organics which do not provide the improvement and, therefore, are not the subject of the invention.

The calcined products of some of these examples had the equilibrium adsorption values shown in Table D.

TABLE D

| | EQUILIBRIUM BENZENE ADSORPTION VALUES (g/100 g) | |
|---|---|---|
| Example | 50 Torr | 60 Torr |
| 1 | 66 | 68 |
| 10 | 32 | 35 |
| 11 | 36 | 40 |
| 12 | 39 | 48 |
| 13 | 38 | 57 |
| 14 | 36 | 50 |
| 15 | 43 | 50 |
| 18 | 31 | 32 |
| 19 | 42 | 55 |
| 20 | 60 | 62 |
| 21 | 44 | 60 |
| 22 | 34 | 52 |
| 23 | 36 | 47 |
| 24 | 38 | 48 |
| 25 | 48 | 59 |
| 26 | 48 | 57 |
| 27 | 54 | 61 |
| 28 | 34 | 40 |
| 29 | 33 | 35 |
| 32 | 28 | 33 |
| 34 | 23 | 25 |
| 37 | 53 | 55 |
| 38 | 51 | 53 |
| 40 | 56 | 57 |

EXAMPLE 41

To eighty grams of a solution of cetyltrimethylammonium hydroxide (CTMAOH) prepared as in Example 1 was added 1.65 grams of NaAlO$_2$. The mixture was stirred at room temperature until the NaAlO$_2$ was dissolved. To this solution was added 40 grams of tetramethylammonium (TMA) silicate solution (10 wt. % SiO$_2$), 10 grams of HiSil, 200 grams of water and 70 grams of the auxiliary organic 1,3,5-trimethylbenzene.

TABLE C

| Example | Auxiliary Organic | Boiling Point | Density | Mol. wt. | Moles of aux. | Aux. Org/silica | d-Spacing, Angstroms |
|---|---|---|---|---|---|---|---|
| 1 | None | — | — | — | — | — | 36.8 |
| 10 | benzene | 80 | 0.874 | 78.11 | 0.128 | 0.59 | 43.5 |
| 11 | toluene | 111 | 0.867 | 92.14 | 0.109 | 0.50 | 47.6 |
| 12 | p-xylene | 138 | 0.866 | 106.17 | 0.094 | 0.44 | 49.8 |
| 13 | 1,3,5-trimethylbenzene | 163 | 0.864 | 120.20 | 0.083 | 0.39 | 51.2 |
| 14 | 1,3,5-triethylbenzene | 215 | 0.861 | 162.28 | 0.062 | 0.29 | 48.1 |
| 15 | 1,3,5-triisopropylbenzene | 234 | 0.845 | 204.36 | 0.049 | 0.23 | 44.9 |
| 16 | bromobenzene | 157 | 1.491 | 157.02 | 0.064 | 0.30 | 42.8 |
| 17 | α-chloro-p-xylene | 200 | 1.15 | 104.61 | 0.096 | 0.44 | amorphous |
| 18 | styrene | 146 | 0.909 | 104.15 | 0.096 | 0.44 | amorphous |
| 19 | 1,3-dimethyladamantane | — | 0.886 | 164.29 | 0.061 | 0.28 | 48.9 |
| 20 | n-pentane | 36 | 0.626 | 72.15 | 0.139 | 0.64 | 47.2 |
| 21 | n-hexane | 69 | 0.659 | 86.18 | 0.116 | 0.54 | 50.7 |
| 22 | n-heptane | 98 | 0.684 | 100.21 | 0.100 | 0.46 | 50.7 |
| 23 | n-octane | 126 | 0.703 | 114.23 | 0.088 | 0.41 | 51.7 |
| 24 | n-nonane | 151 | 0.718 | 128.26 | 0.078 | 0.36 | 48.9 |
| 25 | n-decane | 174 | 0.730 | 142.29 | 0.070 | 0.33 | 46.4 |
| 26 | n-dodecane | 216 | 0.750 | 170.34 | 0.059 | 0.27 | 42.8 |
| 27 | n-octadecane | 317 | 0.777 | 254.50 | 0.039 | 0.18 | 37.0 |
| 28 | 1-phenylnonane | 282 | 0.858 | 204.36 | 0.049 | 0.23 | 46.4 |
| 29 | 1,8-dibromoctane | 271 | 1.477 | 272.03 | 0.037 | 0.17 | 44.9 |
| 30 | 1-butanol | 118 | 0.810 | 74.12 | 0.135 | 0.62 | 37.5 |
| 31 | 1-propanol | 97 | 0.804 | 60.10 | 0.166 | 0.77 | amorphous |
| 32 | 1-pentanol | 137 | 0.811 | 88.15 | 0.113 | 0.53 | amorphous |
| 33 | cyclohexanol | 161 | 0.963 | 100.16 | 0.100 | 0.46 | amorphous |
| 34 | phenol | 182 | 1.071 | 94.11 | 0.106 | 0.49 | amorphous |
| 35 | 2,4,6-trimethylphenol | 220 | — | 136.19 | 0.073 | 0.34 | amorphous |
| 36 | 2,4,6-mesitaldehyde | 237 | 1.005 | 148.21 | 0.067 | 0.31 | amorphous |
| 37 | 12-crown-4 | — | 1.089 | 176.21 | 0.057 | 0.26 | 37.5 |
| 38 | pyridene | 115 | 0.978 | 79.10 | 0.126 | 0.59 | 46.4 |
| 39 | 1-adamantanamine | — | — | 151.25 | 0.066 | 0.31 | 39.1 |
| 40 | N,N,N',N'-Tetrakis (2-hydroxyethyl) ethylenediamine | — | — | 236.31 | 0.042 | 0.20 | 38.1 |

The resulting mixture was stirred at room temperature for several minutes. The gel was then loaded into a 600 cc autoclave and heated at 105° C. for sixty-eight hours with stirring at 150 rpm. The mixture had a composition in terms of moles per mole $Al_2O_3$:

1.25 moles $Na_2O$
27.8 moles $SiO_2$
5.1 moles $(CTMA)_2O$
2.24 moles $(TMA)_2O$
2256 moles $H_2O$
80.53 moles trimethylbenzene The resulting product was filtered and washed several times with warm (60°–70° C.) distilled water and with acetone. The final product was calcined to 538° C. in a $N_2$/air mixture and then held in air for about 10 hours.

The calcined product proved to have an equilbrium benzene adsorption capacity of >25 grams/100 grams.

The X-ray diffraction pattern of the calcined product of this example may be characterized as including a broad, very strong relative intensity line at about 102 Angstroms d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different $d_{100}$ values as observed in their electron diffraction patterns. These materials were found to possess $d_{100}$ values between about 85 Angstroms d-spacing and about 120 Angstroms d-spacing.

EXAMPLE 42

To eighty grams of solution of cetyltrimethylammonium hydroxide (CTMAOH) prepared as in Example 1 was added 1.65 grams of $NaAlO_2$. The mixture was stirred at room temperature until the $NaAlO_2$ was dissolved. To this solution was added 40 grams of tetramethylammonium (TMA) silicate solution (10 wt. % $SiO_2$), 10 grams of HiSil, 200 grams of water and 120 grams of the auxiliary organic 1,3,5-trimethylbenzene. The resulting mixture was stirred at room temperature for several minutes. The gel was then loaded into a 600 cc autoclave and heated at 105° C. for ninety hours with stirring at 150 rpm. The mixture had a composition in terms of moles per mole $Al_2O_3$:

1.25 moles $Na_2O$
27.8 moles $SiO_2$
5.1 moles $(CTMA)_2O$
2.24 moles $(TMA)_2O$
2256 moles $H_2O$
132.7 moles trimethylbenzene The resulting product was filtered and washed several times with warm (60°–70° C.) distilled water and with acetone. The final product was calcined to 538° C. in a $N_2$/air mixture and then held in air for about 10 hours.

The calcined product proved to have a surface area of 915 $m^2$/g and an equilbrium benzene adsorption capacity of >25 grams/100 grams. Argon physisorption data indicated an argon uptake of 0.95 cc/gram, and a pore size centered on 78 Angstroms (Dollimore-Heal Method, see Example 43(b)), but running from 70 to greater than 105 Angstroms.

The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product of this example contained several materials with different $d_{100}$ values as observed in their electron diffraction patterns. These materials were found to possess $d_{100}$ values between about 8 Angstroms d-spacing and about 110 Angstroms d-spacing.

EXAMPLE 43(a)

Argon Physisorption For Pore Systems Up to About 60 Angstroms Diameter

To determine the pore diameters of the products of the method of this invention with pores up to about 60 Angstroms in diameter, 0.2 gram samples of the products of Examples 1, 3 and 4 were placed in glass sample tubes and attached to a physisorption apparatus as described in U.S. Pat. No. 4,762,010, which is incorporated herein by reference.

The samples were heated to 300° C. for 3 hours in vacuo to remove adsorbed water. Thereafter, the samples were cooled to 87° K. by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes were used. (See also S. J. Gregg et al., *Adsorption, Surface Area and Porosity*, 2nd ed., Academic Press, 1982). In each instance, a graph of the amount adsorbed versus the relative pressure above the sample, at equilibrium, constitutes the adsorption isotherm for the product sample. It is common to use relative pressures which are obtained by forming the ratio of the equilibrium pressure and the vapor pressure $P_o$ of the adsorbate at the temperature where the isotherm is measured. Sufficiently small amounts of argon were admitted in each step to generate sufficient data points in the relative pressure range from 0 to 0.6. At least about 100 points are required to define the isotherm with sufficient detail.

The step (inflection) in the isotherm indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log $(P/P_o)$ is formed. The conversion of the position of an adsorption peak in terms of log $(P/P_o)$ to the physical pore diameter in Angstroms obtained by using the following formula:

$$\log(P/P_o) = \frac{K}{d - 0.38} \left( \frac{S^4}{3(L - D/2)^3} - \frac{S^{10}}{9(L - D/2)^9} - \frac{S^4}{3(D/2)^3} + \frac{S^{10}}{9(D/2)^9} \right)$$

wherein d=pore diameter in nanometers, K=32.17, S=0.2446, L=d+0.19, and D=0.57.

This formula is derived from the method of Horvath and Kawazoe (G. Horvath et al., *J. Chem. Eng.* Japan 16 (6) 470(1983)). The constants required for the implementation of this formula were determined from a measured isotherm of ALPO-5 and its known pore size. This method is particularly useful for microporous materials having pores of up to about 60 Angstroms in diameter.

The results of this procedure for the samples from Examples 1, 3 and 4 are included in Table A. The sample from Example 1 gave two separate peaks, believed to be the result of two separate ultra-large pore phases in the product.

EXAMPLE 43(b)

Argon Physisorption For Pore Systems Over About 60 Angstroms Diameter

The above method of Horvath and Kawazoe for determining pore size from physisorption isotherms was intended to be applied to pore systems of up to 20 Angstroms diameter; but with some care as above detailed, its use can be extended to pores of up to 60 Angstroms diameter.

In the pore regime above 60 Angstroms diameter, however, the Kelvin equation can be applied. It is usually given as:

$$\ln(P/P_o) = \frac{-2\gamma V}{r_k RT} \cos\theta$$

where:
- $\gamma$ = surface tension of sorbate
- V = molar volume of sorbate
- $\Theta$ = contact angle (usually taken for practical reasons to be 0)
- R = gas constant
- T = absolute temperature
- $r_k$ = capillary condensate (pore) radius
- $P/P_o$ = relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstrom diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, J. APPLIED CHEM, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

The products of Examples 6, 7 and 9 were subjected to the Dollimore and Heal Method for argon physisorption data, as indicated in Table A.

EXAMPLE 44

Transmission Electron Microscopy

To further illustrate the nature of the crystalline product of the method of this invention, samples of the products from the preceeding examples were studied by transmission electron microscopy (TEM) as noted above. TEM is a technique used to reveal the microscopic structure of materials, including crystalline materials.

In order to illuminate the microstructure of materials, samples must be thin enough for an electron beam to pass through them, generally about 500–1000 Angstrom units or so thick. The crystal morphology of the present materials usually required that they be prepared for study by ultramicrotomy. While time consuming, this technique of sample preparation is quite familiar to those skilled in the art of electron microscopy. The materials are embedded in a resin, in this case a commercially available low viscosity acrylic resin L. R. WHITE (hard), which is then cured at about 80° C. for about 1½ hours. Thin sections of the block are cut on an ultramicrotome using a diamond knife and sections in the thickness range 500–1000 Angstrom units are collected on fine mesh electron microscope support grids. For these materials, an LKB model microtome with a 45° C. diamond knife edge was used; the support grids were 400 mesh copper grids. After evaporation of a thin carbon coating on the sample to prevent charging in the microscope (light gray color on a white sheet of paper next to the sample in the evaporator), the samples are ready for examination in the TEM.

A simpler specimen technique can be used for most preparations if mere verification of the presence of the product is desired. This involves deposition of a dispersion of the material on a carbon coated lacy Formvar electron microscope support after grinding and sonication in propanol. One can usually find fragments or regions near the edges of crystals sufficiently thin to obtain electron diffraction patterns and lattice images. Many times, these are inferior to those obtained from thin section specimens, but usually adequate patterns and images can be obtained. Several examples studied by TEM and electron diffraction in this application were characterized using specimens prepared from a dispersion of the material.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDP's are readily produced on modern TEM instruments using, e.g. the selected area field limiting aperture technique familiar to those skilled in the art of electron microscopy. When an EDP with the desired arrangement of diffraction spots is observed, the corresponding image of the crystal giving that EDP will reveal details of the microstructure along the direction of projection indicated by the EDP. In this way, different projections of a crystal's structure can be observed and identified using TEM.

In order to observe the salient features of the crystalline product, it is necessary to view the material in an orientation wherein the corresponding EDP gives a particular, e.g. hexagonal, arrangement of diffraction spots from a single individual crystal. If multiple crystals are present within the field limiting aperture, overlapping diffraction patterns will occur that can be quite difficult to interpret. The number of diffraction spots observed depends to a degree upon the regularity of the crystalline arrangement in the material, among other things. At the very least, however, the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located. This latter technique was used to produce the electron micrographs discussed below.

Samples of materials from examples were examined by the techniques described above in a JEOL 200 CX transmission electron microscope operated at 200,000 volts with an effective 2 Angstrom objective aperture in place. The instrument has a point-to-point resolution of 4.5 Angstroms. Other experimental arrangements familiar to one skilled in the art of high resolution (phase contrast) TEM could be used to produce equivalent images provided care is taken to keep the objective lens on the underfocus (weak lens) side of the minimum contrast lens current setting. The micrographs showed a reasonably regular array of large channels in a hexagonal arrangement for products of Examples 1-9, 19, 20, 25, 41 and 42. The $d_{100}$ values for these examples were determined from electron diffraction patterns. These were consistent in each case with the position of the first peak in the X-ray diffraction pattern of the respective material.

What is claimed is:

1. A method for synthesizing a composition of matter comprising an inorganic, non-layered, porous crystalline phase material having, after calcination, an arrangement of uniformly-sized pores having diameters of at least about 13 Angstrom Units, exhibiting an X-ray diffraction pattern with at least one peak at a position greater than about 18 Angstrom Units d-spacing and exhibiting a benzene adsorption capacity of greater than about 15 grams benzene per 100 grams at 50 torr and 25° C., which comprises (i) preparing a reaction mixture capable of forming said composition, said mixture comprising one or a combination of oxides selected from the group consisting of divalent element, trivalent element, tetravalent element and pentavalent element, organic directing agent and solvent or solvent mixture, said organic directing agent comprising an ion of the formula $R_1R_2R_3R_4Q^{30}$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof, (ii) maintaining said mixture under sufficient conditions of pH, temperature and time for formation of said composition of matter and (iii) recovering said composition of matter, wherein added to said reaction mixture is an auxiliary organic selected from the group consisting of (1) aromatic hydrocarbons and amines of from 5 to 20 carbons and halogen- and $C_1$-$C_{14}$ alkyl-substituted derivatives thereof, (2) cyclic aliphatic hydrocarbons and amines of from 5 to 20 carbons and halogen- and $C_1$-$C_{14}$ alkyl-substituted derivatives thereof, (3) polycyclic aliphatic hydrocarbons and amines of from 6 to 20 carbons and halogen- and $C_1$-$C_{14}$ alkyl-substituted derivatives thereof, (4) straight and branched aliphatic hydrocarbons and amines of from 3 to 16 carbons and halogen-substituted derivatives thereof, and (5) combinations thereof.

2. The method of claim 1 wherein said auxiliary organic is present in said reaction mixture such that the mole ratio of auxiliary organic/tetravalent element oxide is from about 0.05 to about 20.

3. The method of claim 1 wherein said auxiliary organic is selected from the group consisting of an aromatic hydrocarbon of 6 to 20 carbons; a cyclic aliphatic hydrocarbon of 5 to 20 carbons; a polycyclic aliphatic hydrocarbon of 6 to 20 carbons; and combinations thereof.

4. The method of claim 1 wherein said auxiliary organic is selected from the group consisting of a straight chain aliphatic hydrocarbon of from about 3 to about 16 carbon atoms, branched chain aliphatic hydrocarbon of from about 3 to about 16 carbon atoms and combinations thereof.

5. The method of claim 3 wherein said auxiliary organic is selected from the group consisting of benzene, alkyl-substituted benzene, alkyl-substituted adamantane and combinations thereof, alkyl being of from 1 to about 14 carbon atoms.

6. The method of claim 5 wherein said auxiliary organic is selected from the group consisting of p-xylene, trimethylbenzene, triethylbenzene, dimethyladamantane and combinations thereof.

7. The method of claim 1 wherein said auxiliary organic is selected from the group consisting of pentane, hexane, heptane, octane, nonane, decane, dodecane, dihalooctane and combinations thereof.

8. The method of claim 3 wherein said auxiliary organic is present in said reaction mixture such that the mole ratio of auxiliary organic/tetravalent element oxide is from about 0.1 to about 10.

9. The method of claim 4 wherein said auxiliary organic is present in said reaction mixture such that the mole ratio of auxiliary organic/tetravalent element oxide is from about 0.1 to about 10.

10. The method of claim 1 wherein said reaction mixture has a composition, in terms of mole ratios, within the following ranges:

| | |
|---|---|
| $X_2O_3/YO_2$ | 0 to 0.5 |
| $Al_2O_3/SiO_2$ | 0 to 0.01 |
| $X_2O_3/(YO_2 + Z_2O_5)$ | 0.1 to 100 |
| $X_2O_3/(YO_2 + W'O + Z_2O_5)$ | 0.1 to 100 |
| Solvent/$(YO_2 + W'O + Z_2O_5 + X_2O_3)$ | 1 to 1500 |
| $OH^-/YO_2$ | 0 to 10 |
| $(M_{2/e}O + R_{2/f}O)/(YO_2 + W'O + Z_2O_5 + X_2O_3)$ | 0.01 to 20 |
| $M_{2/e}O/(YO_2 + W'O + Z_2O_5 + X_2O_3)$ | 0 to 10 |
| $R_{2/f}O/(YO_2 + W'O + Z_2O_5 + X_2O_3)$ | 0.01 to 2.0 |

-continued

| | |
|---|---|
| Auxiliary Organic/YO$_2$ | 0.05 to 20 |
| Auxiliary Organic/R$_{2/f}$O | 0.02 to 100 | wherein M is said alkali or alkaline earth metal cation, W' is said divalent element, X is said trivalent element, Y is said tetravalent element, Z is said pentavalent element, R is said organic directing agent, and e and f are the weighted average valences of M and R, respectively.

11. The method of claim 10 wherein said auxiliary organic is selected from the group consisting of an aromatic hydrocarbon of 6 to 20 carbons; a cyclic aliphatic hydrocarbon of 5 to 20 carbons; a polycyclic aliphatic of 6 to 20 carbons; and combinations thereof.

12. The method of claim 10 wherein said auxiliary organic is selected from the group consisting of a straight chain aliphatic hydrocarbon of from about 3 to about 16 carbon atoms, branched chain aliphatic hydrocarbon of from about 3 to about 16 carbon atoms and combinations thereof.

13. The method of claim 10 wherein R is selected from the group consisting of cetyltrimethylammonium, octadecyltrimethylammonium, benzyltrimethylammonium, cetylpryidinium, myristyltrimethylammonium, decyltrimethylammonium, dodecyltrimethylammonium and dimethyldidodecylammonium.

14. The method of claim 1 wherein said reaction mixture has a composition, in terms of mole ratios, within the following ranges:

| | |
|---|---|
| X$_2$O$_3$/YO$_2$ | 0 to 0.5 |
| X$_2$O$_3$/(YO$_2$ + Z$_2$O$_5$) | 0.1 to 100 |
| X$_2$O$_3$/(YO$_2$ + W'O + Z$_2$O$_5$) | 0.1 to 100 |
| Solvent/(YO$_2$ + W'O + Z$_2$O$_5$ + X$_2$O$_3$) | 1 to 1500 |
| OH$^-$/YO$_2$ | 0 to 10 |
| (M$_{2/e}$O + R$_{2/f}$O)/(YO$_2$ + W'O + Z$_2$O$_5$ + X$_2$O$_3$) | 0.01 to 20 |
| M$_{2/e}$O/(YO$_2$ + W'O + Z$_2$O$_5$ + X$_2$O$_3$) | 0 to 10 |
| R$_{2/f}$O/(YO$_2$ + W'O + Z$_2$O$_5$ + X$_2$O$_3$) | 0.01 to 2.0 |
| Auxiliary Organic/YO$_2$ | 0.05 to 20 |
| Auxiliary Organic/R$_{2/f}$O | 0.02 to 100 | wherein M is said alkali or alkaline earth metal cation, W' is said divalent element, X is said trivalent element, Y is said tetravalent element, Z is said pentavalent element, R comprises a mixture of component (a) an ion of the formula R$_1$R$_2$R$_3$R$_4$Q$^+$, wherein Q is nitrogen or phosphorus and wherein at least one of R$_1$, R$_2$, R$_3$ and R$_4$ is selected from the group consisting of aryl of from 6 to about 36 carbon atoms, alkyl of from 6 to about 36 carbon atoms and combinations thereof, the remainder of R$_1$, R$_2$, R$_3$ and R$_4$ being selected from the group consisting of hydrogen, alkyl of from 1 to 5 carbon atoms and combinations thereof, and component (b) an additional ion of the formula R$_1$R$_2$R$_3$R$_4$Q$^+$ wherein R$_1$, R$_2$, R$_3$ and R$_4$ are selected from the group consisting of hydrogen, alkyl of 1 to 5 carbon atoms and combinations thereof, and wherein e and f are weighted average valences of M and R, respectively.

15. The method of claim 14 wherein said auxiliary organic is selected from the group consisting of an aromatic hydrocarbon of 6 to 20 carbons; a cyclic aliphatic hydrocarbon of 5 to 20 carbons; a polycyclic aliphatic of 6 to 20 carbons; and combinations thereof.

16. The method of claim 14 wherein said auxiliary organic is selected from the group consisting of a straight chain aliphatic hydrocarbon of from about 3 to about 16 carbon atoms, branched chain aliphatic hydrocarbon of from about 3 to about 16 carbon atoms and combinations thereof.

17. The method of claim 14 wherein R is selected from the group consisting of cetyltrimethylammonium, octadecyltrimethylammonium, benzyltrimethylammonium, cetylpryidinium, myristyltrimethylammonium, decyltrimethylammonium, dodecyltrimethylammonium and dimethyldidodecylammonium.

18. The method of claim 1 wherein said reaction mixture has a composition, in terms of mole ratios, within the following ranges:

| | |
|---|---|
| Al$_2$O$_3$/SiO$_2$ | 0 to 0.1 |
| Solvent/SiO$_2$ | 1 to 1500 |
| OH$^-$/SiO$_2$ | 0 to 10 |
| (M$_{2/e}$O + R$_{2/f}$O)/(SiO$_2$ + Al$_2$O$_3$) | 0.01 to 20 |
| M$_{2/e}$O/(SiO$_2$ + Al$_2$O$_3$) | 0 to 5 |
| R$_{2/f}$O/(SiO$_2$ + Al$_2$O$_3$) | 0.01 to 2 |
| Auxiliary Organic/SiO$_2$ | 0.05 to 20 |
| Auxiliary Organic/R$_{2/f}$O | 0.02 to 100 | wherein M is said alkali or alkaline earth metal cation, R is said organic direction agent, e and f are the weighted average valences of M and R, respectively.

19. The method of claim 18 wherein said auxiliary organic is selected from the group consisting of an aromatic hydrocarbon of 6 to 20 carbons; a cyclic aliphatic hydrocarbon of 5 to 20 carbons; a polycyclic aliphatic of 6 to 20 carbons; and combinations thereof.

20. The method of claim 18 wherein said auxiliary organic is selected from the group consisting of a straight chain aliphatic hydrocarbon of from about 3 to about 16 carbon atoms, branched chain aliphatic hydrocarbon of from about 3 to about 16 carbon atoms and combinations thereof.

21. The method of claim 18 wherein R is selected from the group consisting of cetyltrimethylammonium, octadecyltrimethylammonium, benzyltrimethylammonium, cetylpryidinium, myristyltrimethylammonium, decyltrimethylammonium, dodecyltrimethylammonium and dimethyldidodecylammonium.

22. The method of claim 18 wherein said source of an oxide of silicon comprises an organic silicate.

23. The method of claim 22 wherein said organic silicate comprises a quaternary ammonium silicate.

24. The method of claim 22 wherein said organic silicate comprises tetraethylorthosilicate.

25. The method of claim 1 wherein said crystalline phase has, after calcination, a hexagonal arrangement of uniformly-sized pores having diameters of at least about 13 Angstrom Units and exhibits a hexagonal electron diffraction pattern than can be indexed with a d$_{100}$ value greater than about 18 Angstrom Units.

26. The method of claim 25 wherein said auxiliary organic is present in said reaction mixture such that the mole ratio of auxiliary organic/tetravalent element oxide is from about 0.05 to about 20.

27. The method of claim 25 wherein said auxiliary organic is selected from the group consisting of an aromatic hydrocarbon of 6 to 20 carbons; a cyclic aliphatic hydrocarbon of 5 to 20 carbons; a polycyclic aliphatic of 6 to 20 carbons; and combinations thereof.

28. The method of claim 25 wherein said auxiliary organic is selected from the group consisting of a straight chain aliphatic hydrocarbon of about 3 to about 16 carbon atoms, branched chain aliphatic hydrocarbon of from about 3 to about 16 carbon atoms and combinations thereof.

29. The method of claim 25 wherein said auxiliary organic is selected from the group consisting of benzene, alkyl-substituted benzene, alkyl-substituted adamantane and combinations thereof, alkyl being of from 1 to about 14 carbon atoms.

30. The method of claim 25 wherein said auxiliary organic is selected from the group consisting of p-xylene, trimethylbenzene, triethylbenzene, dimethyladamantane and combinations thereof.

31. The method of claim 25 wherein said auxiliary organic is selected from the group consisting of pentane, hexane, heptane, octane, nonane, decane, dodecane, octadecane, dihalooctane and combinations thereof.

32. The method of claim 27 wherein said auxiliary organic is present in said reaction mixture such that the mole ratio of auxiliary organic/tetravalent element oxide is from about 0.05 to about 20.

33. The method of claim 28 wherein said auxiliary organic is present in said reaction mixture such that the mole ratio of auxiliary organic/tetravalent element oxide is from about 0.05 to about 20.

34. The method of claim 25 wherein said reaction mixture has a composition, in terms of mole ratios, within the following ranges:

| | |
|---|---|
| $X_2O_3/YO_2$ | 0 to 0.5 |
| $Al_2O_3/SiO_2$ | 0 to 0.01 |
| $X_2O_3/(YO_2 + Z_2O_5)$ | 0.1 to 100 |
| $X_2O_3/(YO_2 + W'O + Z_2O_5)$ | 0.1 to 100 |
| Solvent/$(YO_2 + W'O + Z_2O_5 + X_2O_3)$ | 1 to 1500 |
| $OH^-/YO_2$ | 0 to 10 |
| $(M_{2/e}O + R_{2/f}O)/(YO_2 + W'O + Z_2O_5 + X_2O_3)$ | 0.01 to 20 |
| $M_{2/e}O/(YO_2 + W'O + Z_2O_5 + X_2O_3)$ | 0 to 10 |
| $R_{2/f}O/(YO_2 + W'O + Z_2O_5 + X_2O_3)$ | 0.01 to 2.0 |
| Auxiliary Organic/$YO_2$ | 0.05 to 20 |
| Auxiliary Organic/$R_{2/f}O$ | 0.02 to 100 | wherein M is said alkali or alkaline earth metal cation, W' is said divalent element, X is said trivalent element, Y is said tetravalent element, Z is said pentavalent element, R is said organic directing agent, and e and f are the weighted average valences of M and R, respectively.

35. The method of claim 25 wherein said reaction mixture has a composition, in terms of mole ratios, within the following ranges:

| | |
|---|---|
| $X_2O_3/YO_2$ | 0 to 0.5 |
| $X_2O_3/(YO_2 + Z_2O_5)$ | 0.1 to 100 |
| $X_2O_3/(YO_2 + W'O + Z_2O_5)$ | 0.1 to 100 |
| Solvent/$(YO_2 + W'O + Z_2O_5 + X_2O_3)$ | 1 to 1500 |
| $OH^-/YO_2$ | 0 to 10 |
| $(M_{2/e}O + R_{2/f}O)/(YO_2 + W'O + Z_2O_5 + X_2O_3)$ | 0.01 to 20 |
| $M_{2/e}O/(YO_2 + W'O + Z_2O_5 + X_2O_3)$ | 0 to 10 |
| $R_{2/f}O/(YO_2 + W'O + Z_2O_5 + X_2O_3)$ | 0.01 to 2.0 |
| Auxiliary Organic/$YO_2$ | 0.05 to 20 |
| Auxiliary Organic/$R_{2/f}O$ | 0.02 to 100 | wherein M is said alkali or alkaline earth metal cation, W' is said divalent element, X is said trivalent element, Y is said tetravalent element, Z is said pentavalent element, R comprises a mixture of component (a) an ion of the formula $R_1R_2R_3R_4Q^+$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof, and component (b) an additional ion of the formula $R_1R_2R_3R_4Q^+$ wherein $R_1$, $R_2$, $R_3$ and $R_4$ are selected from the group consisting of hydrogen, alkyl of 1 to 5 carbon atoms and combinations thereof, and wherein e and f are weighted average valences of M and R, respectively.

36. The method of claim 25 wherein said reaction mixture has a composition, in terms of mole ratios, within the following ranges:

| | |
|---|---|
| $Al_2O_3/SiO_2$ | 0 to 0.1 |
| Solvent/$SiO_2$ | 1 to 1500 |
| $OH^-/SiO_2$ | 0 to 10 |
| $(M_{2/e}O + R_{2/f}O)/(SiO_2 + Al_2O_3)$ | 0.01 to 20 |
| $M_{2/e}O/(SiO_2 + Al_2O_3)$ | 0 to 5 |
| $R_{2/f}O/(SiO_2 + Al_2O_3)$ | 0.01 to 2 |
| Auxiliary Organic/$SiO_2$ | 0.05 to 20 |
| Auxiliary Organic/$R_{2/f}O$ | 0.02 to 100 | wherein M is said alkali or alkaline earth metal cation, R is said organic directing agent, e and f are the weighted average valences of M and R, respectively.

37. A method for synthesizing a composition of matter comprising an inorganic, non-layered, porous crystalline phase material having, after calcination, an arrangement of uniformly-sized pores having diameters of at least about 13 Angstrom Units, exhibiting an X-ray diffraction pattern with at least two peaks at positions greater than about 10 Angstrom Units d-spacing, at least one of which is at a position greater than about 18 Angstrom Units d-spacing, and no peaks at positions less than about 10 Angstrom Units d-spacing with relative intensity greater than about 20% of the strongest peak, which comprises (i) preparing a reaction mixture capable of forming said composition, said mixture comprising one or a combination of oxides selected from the group consisting of divalent element, trivalent element, tetravalent element and pentavalent element, organic directing agent and solvent or solvent mixture, said organic directing agent comprising an ion of the formula $R_1R_2R_3R_4Q^{30}$, wherein Q is nitrogen or phosphorus and wherein at least one of $R_1$, $R_2$, $R_3$ and $R_4$ is selected from the group consisting of aryl of from 6 to about 36 carbon atoms, alkyl of from 6 to about 36 carbon atoms and combinations thereof, the remainder of $R_1$, $R_2$, $R_3$ and $R_4$ being selected from the group consisting of hydrogen, alkyl of from 1 to 5 carbon atoms and combinations thereof, (ii) maintaining said mixture under sufficient conditions of pH, temperature and time for formation of said composition of matter and (iii) recovering said composition of matter, wherein added to said reaction mixture is an auxiliary organic selected from the group consisting of (1) aromatic hydrocarbons and amines of from 5 to 20 carbons and halogen- and $C_1$-$C_{14}$ alkyl-substituted derivatives thereof, (2) cyclic aliphatic hydrocarbons and amines of from 5 to 20 carbons and halogen- and $C_1$-$C_{14}$ alkyl-substituted derivatives thereof, (3) polycyclic aliphatic hydrocarbons and amines of from 6 to 20 carbons and halogen- and $C_1$-$C_{14}$ alkyl-substituted derivatives thereof, (4) straight and branched aliphatic hydrocarbons and amines of from 3 to 16 carbons and halogen-substituted derivatives thereof, and (5) combinations thereof.

38. The method of claim 37 wherein said crystalline phase has, after calcination, a hexagonal arrangement of uniformly-sized pores having diameters of at least about 13 Angstrom Units and exhibits a hexagonal electron diffraction pattern than can be indexed with a $d_{100}$ value greater than about 18 Angstroms Units.

39. The method of claim 38 wherein said auxiliary organic is present in said reaction mixture such that the mole ratio of auxiliary organic/tetravalent element oxide is from about b 0.05 to about 20.

40. The method of claim 38 wherein said auxiliary organic is selected form the group consisting of an aromatic hydrocarbon of 6 to 20 carbons; a cyclic aliphatic hydrocarbon of 5 to 20 carbons; a polycyclic aliphatic of 6 to 20 carbons; and combinations, thereof.

41. The method of claim 38 wherein said auxiliary organic is selected from the group consisting of a straight chain aliphatic hydrocarbon of from about 3 to about 16 carbon atoms, branched chain aliphatic hydrocarbon of from about 3 to about 16 carbon atoms and combinations thereof.

42. The method of claim 38 wherein said auxiliary organic is selected from the group consisting of benzene, alkyl-substituted benzene, alkyl-substituted adamantane and combinations thereof, alkyl being of from 1 to about 14 carbon atoms.

43. The method of claim 38 wherein said auxiliary organic is selected from the group consisting of p-xylene, trimethylbenzene, triethylbenzene, dimethyladamantane and combinations thereof.

* * * * *

UNITED STATES PATENT AND TRADEMARK OFFICE
CERTIFICATE OF CORRECTION

PATENT NO. : 5,057,296

DATED : October 15, 1991

INVENTOR(S) : J.S. Beck

It is certified that error appears in the above-identified patent and that said Letters Patent is hereby corrected as shown below:

Col. 27, claim 1, line 57, "$R_1R_2R_3R_4Q^{30}$" should be --$R_1R_2R_3R_4Q^+$"--

Col. 30, claim 18, line 29, "direction" should be --directing--

Col. 32, claim 37, line 60, "$R_1R_2R_3R_4Q^{30}$" should be --$R_1R_2R_3R_4Q^+$"--

Col. 34, claim 40, line 6, "form" should be --from--

Signed and Sealed this

Twenty-third Day of February, 1993

Attest:

STEPHEN G. KUNIN

*Attesting Officer*         *Acting Commissioner of Patents and Trademarks*